United States Patent
Oshima

(10) Patent No.: US 12,169,745 B2
(45) Date of Patent: Dec. 17, 2024

(54) IMAGE PROCESSING METHOD AND IMAGE PROCESSING APPARATUS FOR ACQUIRING IMAGE DATA OF REPRINT IMAGE HAVING HIGH COLOR REPRODUCIBILITY FROM PRINT IMAGE

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 18/465,953

(22) Filed: Sep. 12, 2023

(65) Prior Publication Data

US 2024/0104323 A1   Mar. 28, 2024

(30) Foreign Application Priority Data

Sep. 26, 2022 (JP) ................... 2022-152749

(51) Int. Cl.
*G06F 3/12* (2006.01)
*G06K 15/02* (2006.01)
*G06T 7/00* (2017.01)

(52) U.S. Cl.
CPC ....... *G06K 15/1878* (2013.01); *G06F 3/1208* (2013.01); *G06T 7/0004* (2013.01); *G06T 2207/10008* (2013.01); *G06T 2207/10024* (2013.01); *G06T 2207/30144* (2013.01)

(58) Field of Classification Search
None
See application file for complete search history.

(56) References Cited

U.S. PATENT DOCUMENTS

| | | | |
|---|---|---|---|
| 5,754,682 A | 5/1998 | Katoh | |
| 6,433,888 B1 | 8/2002 | Patton et al. | |
| 2002/0196346 A1* | 12/2002 | Nishio | H04N 1/6058 348/222.1 |
| 2003/0161006 A1 | 8/2003 | Kobayashi et al. | |
| 2003/0179398 A1* | 9/2003 | Takano | H04N 1/40 358/1.9 |

(Continued)

FOREIGN PATENT DOCUMENTS

| | | |
|---|---|---|
| JP | 2000-235234 A | 8/2000 |
| JP | 2001-235802 A | 8/2001 |

(Continued)

OTHER PUBLICATIONS

The extended European search report issued by the European Patent Office on Feb. 26, 2024, which corresponds to European Patent Application No. 23198136.6-1224 and is related to U.S. Appl. No. 18/465,953.

*Primary Examiner* — Henok Shiferaw

(74) *Attorney, Agent, or Firm* — Studebaker & Brackett PC

(57) ABSTRACT

Provided are an image processing method and an image processing apparatus which can acquire, based on first image data acquired from a first print medium, second image data that realizes high color reproducibility for printing on a new print medium.

In an image processing method and an image processing apparatus, first image data is acquired from a first print medium on which an image is printed, and first image processing is performed with respect to the first image data according to a color reproduction characteristic of the first print medium to acquire the first image data subjected to the first image processing as second image data.

19 Claims, 5 Drawing Sheets

(56) References Cited

U.S. PATENT DOCUMENTS

| | | | |
|---|---|---|---|
| 2004/0201696 A1 | 10/2004 | Yoda | |
| 2005/0185837 A1* | 8/2005 | Takano | H04N 1/6058 382/162 |
| 2005/0237554 A1* | 10/2005 | Yoda | H04N 1/6055 358/1.9 |
| 2011/0268350 A1* | 11/2011 | Tsukada | G06T 1/00 382/154 |
| 2018/0020127 A1* | 1/2018 | Kim | H04N 1/6077 |
| 2022/0189003 A1* | 6/2022 | Ishii | H04N 1/6097 |
| 2022/0207705 A1* | 6/2022 | Morimoto | G06K 15/027 |

FOREIGN PATENT DOCUMENTS

| | | |
|---|---|---|
| JP | 2001-275003 A | 10/2001 |
| JP | 2002-290723 A | 10/2002 |
| JP | 2003-250047 A | 9/2003 |

* cited by examiner

IMAGE PROCESSING METHOD AND IMAGE PROCESSING APPARATUS FOR ACQUIRING IMAGE DATA OF REPRINT IMAGE HAVING HIGH COLOR REPRODUCIBILITY FROM PRINT IMAGE

CROSS-REFERENCE TO RELATED APPLICATIONS

The present application claims priority under 35 U.S.C. § 119 to Japanese Patent Application No. 2022-152749, filed on Sep. 26, 2022. The above application is hereby expressly incorporated by reference, in its entirety, into the present application.

BACKGROUND OF THE INVENTION

1. Field of the Invention

The present invention relates to an image processing method and an image processing apparatus.

2. Description of the Related Art

It is described that scan image data obtained by digitally scanning a photographic print with a digital camera or a scanner is used to reprint an image of the photographic print or to playback display the image of the photographic print, and image data obtained by capturing an instant photographic print with a smartphone is playback displayed and observed (see JP2000-235234A, JP2001-275003A, JP2002-290723A, JP2003-250047A, and JP2001-235802A).

SUMMARY OF THE INVENTION

By the way, in a case of reprinting a scan image of the original photographic print or a case of playback displaying the scan image, it is required that a color and a density of the image of the original photographic print are appropriately reproduced. For example, in a case in which the photographic print is to be reprinted on the scan image captured by the smartphone, particularly in a case in which the photographic print is reprinted on an instant film having low color reproducibility, it is required to realize high print reproducibility.

The present invention solves the problems described above in the related art, and is to provide an image processing method and an image processing apparatus which can acquire, based on first image data acquired from a first print medium on which an image is printed, second image data for reprint that can realize high color reproducibility for printing on a new print medium.

In order to achieve the above object, an aspect of the present invention relates to an image processing method comprising acquiring first image data from a first print medium on which an image is printed, and performing first image processing with respect to the acquired first image data according to a color reproduction characteristic of the first print medium to acquire the first image data subjected to the first image processing as second image data. Here, the second image data may be transmitted to a printer.

In addition, the first image processing may be image processing of correcting color reproduction of the image changed due to the color reproduction characteristic with respect to the first image data.

In addition, the first image data may be image data acquired by scanning.

In addition, the image processing method may further comprise performing second image processing of correcting an influence of the scanning on an image quality with respect to the first image data to acquire the first image data subjected to the second image processing as third image data, in which the first image processing is performed with respect to the third image data to acquire the third image data subjected to the first image processing as the second image data.

In addition, a target of the correction may be an influence of reflected light during imaging and/or ambient light on the image quality.

In addition, the first image data may be scan image data acquired by imaging and scanning the first print medium with a camera-equipped terminal.

In addition, the second image data may be stored in the terminal in association with the first image data and/or the third image data.

In addition, the terminal may include a display device and a playback mode in which the image data is played back, and in the playback mode, the third image data or the second image data may be displayed on the display device based on a mode set by a user.

In addition, the terminal may transmit the second image data to a printer.

In addition, in the second image processing, a user may be able to manually adjust an image quality parameter, and one or more of the image quality parameters may be stored in a terminal as terminal information, or may be stored in the third image data as accessory information.

In addition, the one or more image quality parameters may include at least one of brightness, contrast, or chroma saturation of an image of the third image data.

In addition, in the second image processing, the image quality parameter stored in the third image data may be updated in a case in which the image quality parameter is adjusted.

In addition, the first print medium may have a first region and a second region, and the second image data has a third region and a fourth region corresponding to the first region and the second region, respectively, and image data in which the third region of the second image data is cut out may be transmitted to a printer.

In addition, in the first image processing, it may be discriminated that the print medium has the color reproduction characteristic different from a standard from at least one of a frame design, a print medium size, or the image of the first print medium.

In addition, an identifier that identifies that specific image processing is included in the first image processing may be stored in a terminal as terminal information, or may be stored in the second image data as accessory information.

In addition, an imaging condition and/or an adjustment condition in a case of imaging with the camera-equipped terminal may be decided based on information on a specific region of the first print medium.

In order to achieve the above object, another aspect of the present invention relates to an image processing apparatus comprising a scanner that acquires first image data from a first print medium on which an image is printed, and a processor that performs first image processing with respect to the acquired first image data according to a color reproduction characteristic of the first print medium to acquire the first image data subjected to the first image processing as second image data.

Here, the processor may further perform second image processing of correcting an influence of scanning with the scanner on an image quality with respect to the first image data to acquire the first image data subjected to the second image processing as third image data, and perform the first image processing with respect to the third image data to acquire the third image data subjected to the first image processing as the second image data.

In addition, the image processing apparatus may further comprise a storage that stores the second image data in association with the first image data and/or the third image data.

In addition, the image processing apparatus may further comprise a display device and a playback mode in which the image data is played back, in which, in the playback mode, the third image data or the second image data is displayed on the display device based on a mode set by a user.

In addition, the image processing apparatus may further comprise a communication interface that transmits the second image data to a printer.

According to the aspects of the present invention, it is possible to acquire, based on the first image data acquired from the first print medium on which the image is printed, the second image data for reprint that can realize high color reproducibility for printing on the new print medium.

DESCRIPTION OF THE PREFERRED EMBODIMENTS

Figure 1:
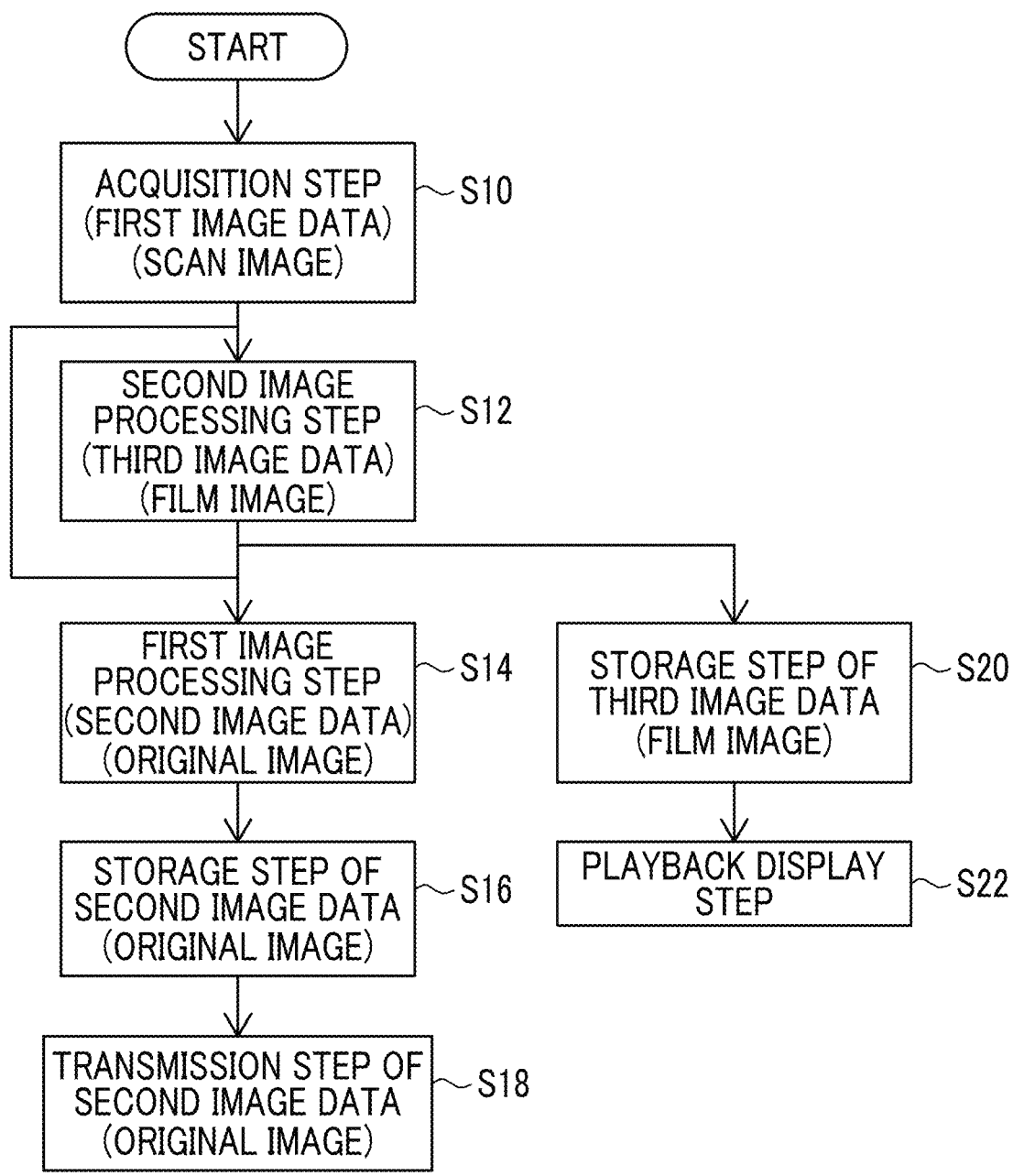
FIG. 1 is a flowchart of an image processing method according to an embodiment of the present invention.

A specific embodiment of the present invention will be described. It should be noted that the embodiment described below is merely an example for ease of understanding of the present invention, and is not intended to limit the present invention. That is, the present invention can be changed or improved from the embodiment described below without departing from the gist of the present invention. Moreover, the present invention includes equivalents thereof.

In addition, in the present specification, the term "image" means an image of an entire region of an original first print medium and a new second print medium (also referred to as reprint) different from the first print medium. Further, the term "image" means, in addition to these images of the entire region, photographic images recorded in a major first region of the first print medium and a third region of the second image data (second print medium) (hereinafter, these two regions are also referred to as a photographic image region, a photographic portion, a printing region). Further, the term "image" is not limited to these, but means an image of a pattern or a design recorded in a second region (hereinafter, also referred to as a frame region and a frame portion) that surrounds the periphery of the first region of the first print medium, and an image of handwritten text described by a user or the like. In addition, in the present invention, a fourth region may be provided that surrounds the periphery of the third region of the second image data (second print medium). In this case, the term "image" also means images of a pattern, a design, a text, and the like recorded in the fourth region (hereinafter, also referred to as a frame region and a frame portion).

In addition, in the present specification, the term "image" also means an image that can be displayed by various types of image data including the first to third image data to be described below, in addition to the images recorded and displayed in the first print medium and the second print medium.

In addition, in the present specification, the term "image data" means data (digital image data) indicating a gradation of each pixel, and means the first image data obtained by imaging or scanning the first print medium, the third image data acquired by performing the second image processing with respect to the first image data, the second image data for printing and output the second print medium, and digital image data of images of the first and second regions of the first print medium and the third and fourth regions of the second image data (second print medium).

Examples of the file format of the image data include joint photographic experts group (JPEG), tagged image file format (Tiff), graphics interchange format (GIF), Microsoft windows bitmap image (BMP), portable network graphics (PNG), and high efficiency image file format (HEIF).

In addition, in the present specification, the term "user" means a subject that uses an image processing method according to the embodiment of the present invention, and specifically, for example, a subject that uses the first image data, the third image data, and the second image data generated by the image processing method according to the embodiment of the present invention, and a subject that views displaying of a film image based on the third image data and an original image based on the second image data. In addition, in the present specification, the term "subject" means a main subject that performs a specific act, can include an individual, a group, a corporation, such as a company, an organization, and the like, and can also further include a computer and a device that constitute artificial intelligence (AI). The artificial intelligence realizes intellectual functions, such as reasoning, prediction, and determination, by using a hardware resource and a software resource. An algorithm of the artificial intelligence is optional, and is, for example, an expert system, a case-based reasoning (CBR), a Bayesian network, or an inclusion architecture.

Embodiment of Present Invention

Hereinafter, an image processing method and an image processing apparatus according to the embodiment of the present invention will be described with reference to the drawings.

The image processing method according to the embodiment of the present invention will be described with reference to FIGS. 1 and 2, and the image processing apparatus according to the embodiment of the present invention will be described with reference to FIG. 3.

FIG. 1 is a flowchart of the image processing method according to the embodiment of the present invention.

Figure 2:
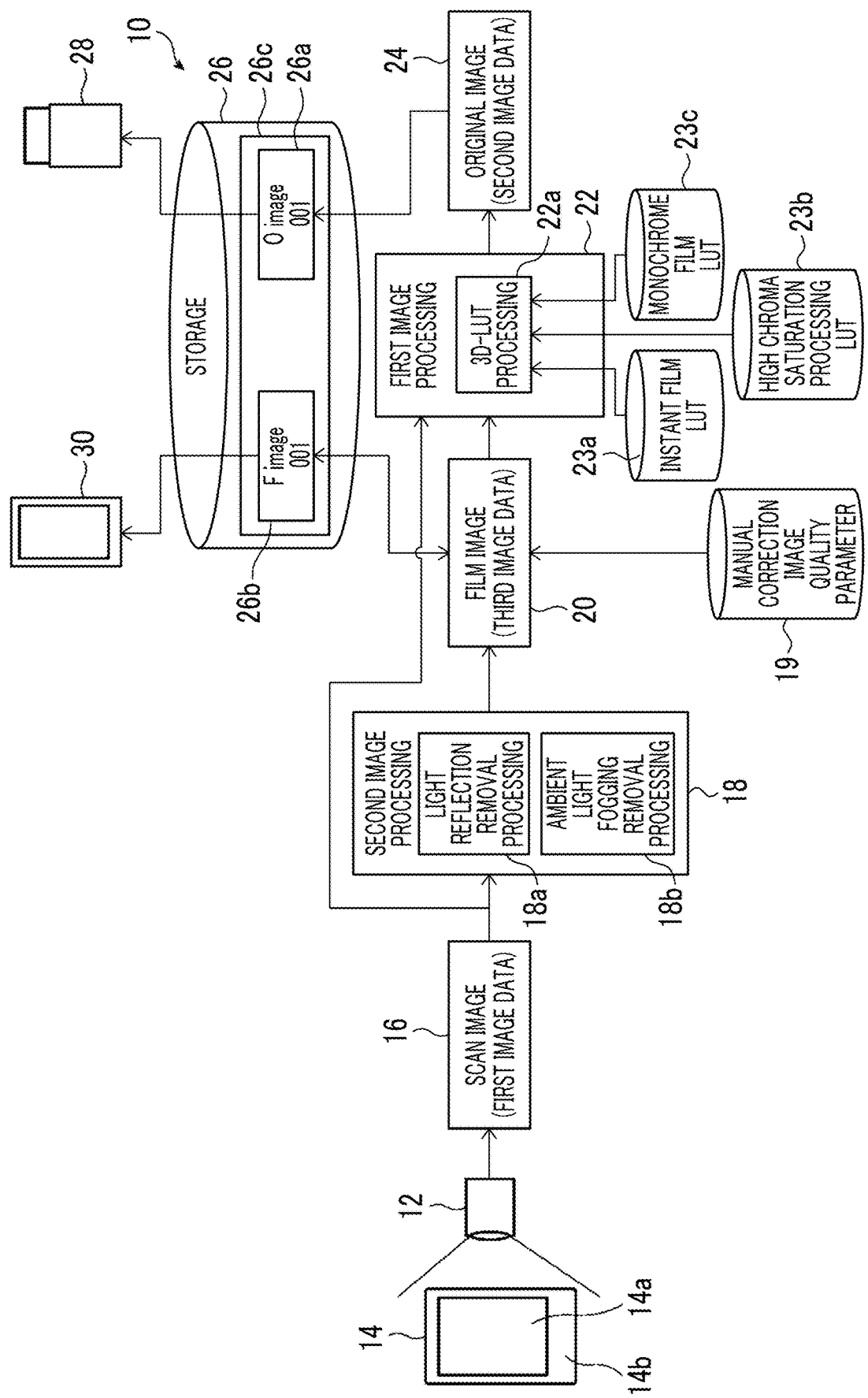
FIG. 2 is a block diagram showing an example of a flow of processing from film scanning to playback display and transmission of image data for reprint in a camera-equipped terminal in which the image processing method shown in FIG. 1 is carried out.

FIG. 2 is a block diagram specifically showing an example of a flow of processing from film scanning to playback display and transmission of image data for reprint in which the image processing method shown in FIG. 1 is carried out.

Figure 3:
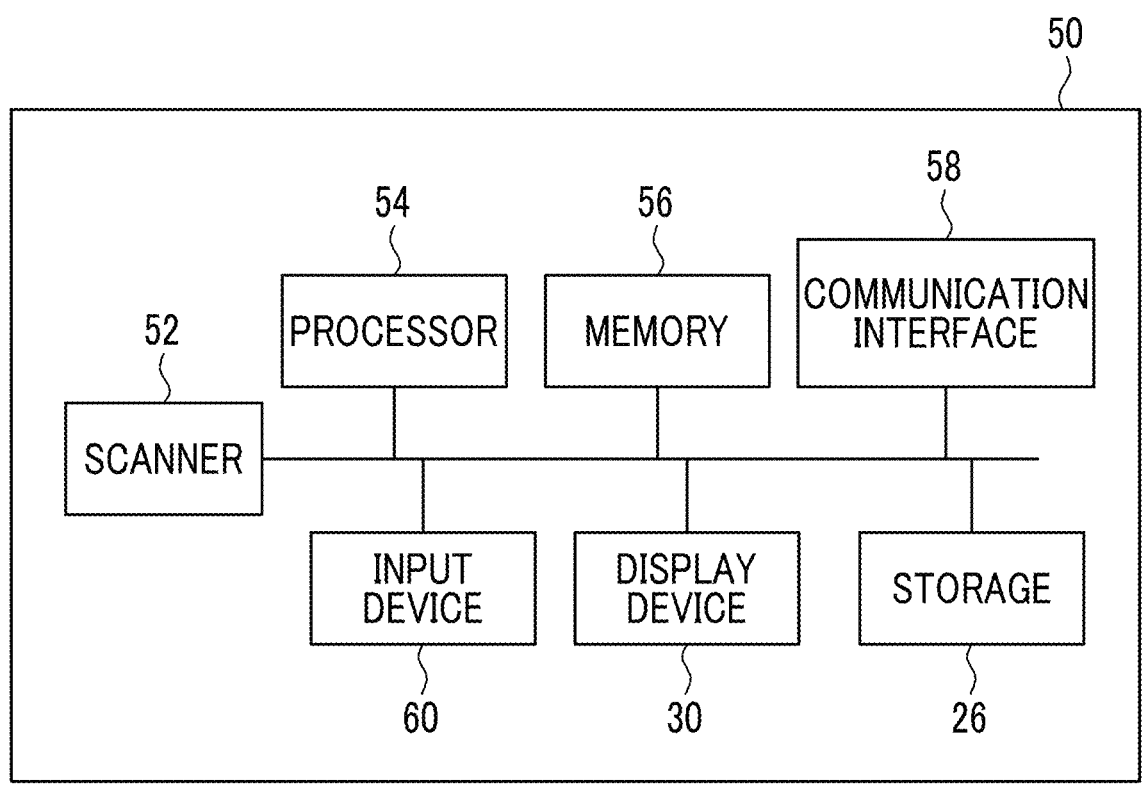
FIG. 3 is a block diagram of an image processing apparatus according to the embodiment of the present invention.

FIG. 3 is a block diagram of the image processing apparatus according to the embodiment of the present invention.

As shown in FIG. 1, the image processing method according to the embodiment of the present invention includes an acquisition step S10 of first image data of a first print medium, a second image processing step S12 of generating third image data from the first image data, a first image processing step S14 of generating second image data from the first image data or the third image data, a storage step S16 of the second image data, a transmission step S18 of the second image data, a storage step S20 of the third image data, and a playback display step S22 using the third image data.

It should be noted that, in the present invention, it is not necessary to perform the second image processing, and in such a case, the second image data may be generated by passing the second image processing step S12 and directly transmitting the first image data to the first image processing step S14 instead of the third image data.

Here, the image processing apparatus shown in FIG. 3 carries out the image processing method shown in FIG. 1 and FIG. 2.

As shown in FIG. 3, an image processing apparatus 50 includes a scanner 52, a processor 54, a memory 56, a communication interface 58, an input device 60, a storage 26, and a display device 30.

Here, the acquisition step S10 of the first image data of the first print medium shown in FIG. 1 is carried out by the scanner 52 shown in FIG. 3.

Next, the second image processing step S12 of generating the third image data from the first image data shown in FIG. 1, and the first image processing step S14 of generating the second image data from the first image data or the third image data are carried out by the processor 54 shown in FIG. 3.

In addition, the storage step S16 of the second image data and the storage step S20 of the third image data shown in FIG. 1 are carried out by the storage 26 shown in FIG. 3.

In addition, the transmission step S18 of the second image data shown in FIG. 1 is carried out by the communication interface 58 shown in FIG. 3.

In addition, the playback display step S22 using the third image data shown in FIG. 1 is carried out by the display device 30 shown in FIG. 3.

First, in the acquisition step S10 of the first image data shown in FIG. 1, as shown in the block diagram of FIG. 2, a first print medium 14 is imaged and scanned with a camera 12 of a camera-equipped terminal 10 to acquire the first image data which is scan image data of a scan image 16.

Here, as the camera-equipped terminal 10, smart media, such as a smartphone which is an information device terminal with an imaging function, can be used. It should be noted that it can also be said that FIG. 2 is an example showing a flow of processing in a device of the smartphone in a case in which the smartphone is used as the camera-equipped terminal 10.

In addition, the camera 12 is a camera of the camera-equipped terminal 10.

Here, the camera-equipped terminal 10 can be used as the image processing apparatus 50 shown in FIG. 3, and the camera 12 can be used as the scanner 52.

Next, the first print medium 14 is a photographic print, such as a rectangular instant film having a first region 14a and a second region 14b printed after being captured by an instant camera, but the present invention is not limited to this, and any print medium may be used, or a print medium that is output by any method may be used.

The first print medium 14 need only have the first region 14a and the second region 14b, and need only be a print in which the photographic image is recorded in the first region 14a. It should be noted that a size and an aspect ratio of the first print medium 14 are also not limited to these sizes and aspect ratios, and may be various sizes and aspect ratios. Further, a shape of the first print medium 14 is not limited to the rectangular shape, and may be various shapes.

In addition, the first print medium 14 may be, for example, a medium in which a photographic image of a photographic film is printed on the first region of the print medium by a photographic printer, may be a medium captured and output by a printer-equipped digital camera, or may be a medium output from any printer.

In the present invention, the first region 14a and the second region 14b of the first print medium 14 mean regions in which different images are recorded, but an image in one region, for example, the first region 14a is the photographic image, and an image in the other region, for example, the second region 14b is an image of a frame that surrounds the periphery of the photographic image. It should be noted that the image of the frame is usually a plain white background on which nothing is recorded, but a pattern forming the frame or the like may be used, or a text handwritten in the frame may be used.

In the present invention, the first image data is not limited to the data acquired by the camera-equipped terminal 10, and may be acquired by any method as long as the first image data can be acquired.

For example, the first image data may be acquired by capturing the image of the entire region of the first print medium 14 with the camera-equipped terminal 10, or may be acquired by scanning the image of the entire region of the first print medium 14 with the scanner 52 shown in FIG. 3 or a duplicator. It should be noted that the scanner 52 may be any scanner as long as the first image data can be acquired.

It should be noted that, in the acquisition step S10, first region image data of the first region 14a and second region image data of the second region 14b of the first print medium 14 may be separately detected as the first image data of the first print medium 14 to acquire the first image data by combining the first region image data and the second region image data, or the first image data of the first print medium 14 may be acquired to separate the first image data into the first region image data and the second region image data.

By the way, the first image data of the scan image 16 generated in this way is transmitted to the second image processing step S12, which will be described below, but the first image data may be directly transmitted to the first image processing step S14 by passing the second image processing step S12.

Next, in the second image processing step S12 shown in FIG. 1, as shown in the block diagram shown in FIG. 2, second image processing 18 of correcting an influence of the scanning on an image quality is performed with respect to the first image data of the scan image 16 acquired in the acquisition step S10 to acquire the first image data subjected to the second image processing 18 as the third image data. Here, the second image processing 18 is carried out by the processor 54 shown in FIG. 3.

That is, the second image processing step S12 is a step of performing the second image processing 18 with respect to the first image data of the scan image 16 by the processor 54 to generate the third image data of an image subjected to the second image processing (hereinafter, referred to as a film image 20) in order to remove an influence of the reflection of light (reflected light) during scanning and/or ambient light from the first image data of the scan image 16 to obtain the image data of the original image of the first print medium 14.

It should be noted that the third image data of the film image 20 generated in this way is transmitted to the storage step S20 of the third image data, which will be described below, is stored in the storage 26, and is transmitted to the first image processing step S14 by the processor 54.

The first print medium 14 is a type of glossy paper, and in a case in which light from a light source, such as a fluorescence lamp, is received, the reflection of the light occurs, the reflection of the light is received during scanning, and a portion that receives the reflection turns white. On the other hand, in a case in which an image is scanned by capturing a picture in an environment of the light source, such as the fluorescence lamp or an incandescent lamp, a white portion which is an imaging target turns yellow or orange due to a light source color, such as a fluorescence lamp color or an incandescent lamp color, resulting in light fogging.

Therefore, in the second image processing 18, two types of the image processing, which are light reflection removal processing 18a and ambient light fogging removal processing 18b, are performed. That is, the second image processing 18 is image processing of removing the influence of the reflection of the light and the ambient light from the first image data comprising image quality parameters, such as brightness, contrast, and chroma saturation of the scan image 16 affected by the influence of the reflection of the light during the scanning of the first print medium 14 and the ambient light, and converting the first image data into the third image data of the film image 20 having the same image quality parameters as the image quality parameters of the original image of the first print medium 14 that is not affected by the influence of the reflection of the light and the ambient light. Here, it is preferable that the image quality parameters include at least one of brightness, contrast, or chroma saturation of the film image of the third image data.

Incidentally, in the second image processing 18 performed in the second image processing step S12, it may be possible for a user to manually adjust the image quality parameters, such as the brightness, the contrast, and the chroma saturation. Accordingly, the color reproducibility of the camera 12 built in the terminal 10 and the color temperature of the scanning environment vary, and thus it is possible to absorb these variation factors based on a result of the manual adjustment of the user.

It should be noted that, based on the result of the manual adjustment of the image quality parameters performed by the user in this way, one or more image quality parameters of manual correction image quality parameters 19 of the individual user, that is, at least one of the brightness, the contrast, or the chroma saturation of the film image 20 may be stored in the terminal 10 as terminal information or stored in the third image data of the film image 20 as accessory information, and the image quality parameters of the second image processing stored in the terminal 10 or the third image data may be updated. It should be noted that one or more image quality parameters may be possessed by a single user, or may be possessed by a plurality of users. It should be noted that the terminal information may be stored in the memory 56 of the image processing apparatus 50, which is the terminal 10, or may be stored in the storage 26.

It should be noted that, the influence of the fogging of the ambient light or the like can be corrected by, for example, extracting a white frame of the second region 14b of the first print medium 14 in which the image is printed on the instant film, using the white frame as a white standard, deciding a white balance gain, and performing the imaging. It should be noted that, in a case in which the second region 14b of the first print medium 14 is a design frame and does not have a white region, the white balance can also be decided from the print image of the first region 14a of the first print medium 14.

As described above, in a case in which the white balance can be decided from the first image data of the scan image 16 of the first print medium 14, such as the instant film, on which the image is printed, the fogging of the ambient light can be automatically corrected, and thus the manual adjustment described above is not necessary or can be done with fine adjustment.

It should be noted that, based on the information of the specific region of the first print medium 14, for example, the second region 14b, an imaging condition in a case of capturing the first print medium 14 with the camera-equipped terminal 10, a scan condition in a case of scanning the first print medium 14 with the scanner 52, and/or an adjustment condition (white balance) may be decided.

Figure 2A:
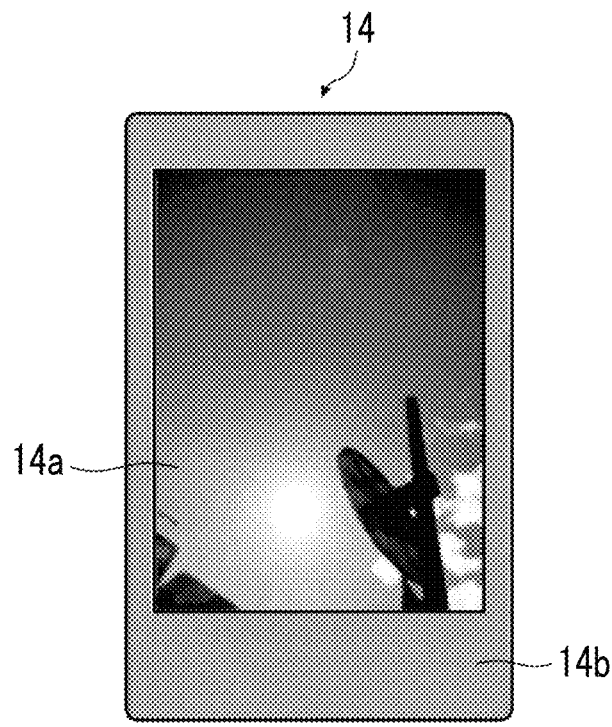
FIG. 2A is a diagram showing an example of a first print medium in which an entire image is affected by ambient light.

Here, FIG. 2A is a diagram showing an example of the first print medium 14 in which the entire images, for example, the photographic image of the first region 14a which is a photographic region and the image of a frame which is the second region 14b are affected by the influence of the ambient light.

A portion of the frame which is the second region 14b of the first print medium 14 shown in FIG. 2A is not a white frame, that is, the portion is not white, and it is assumed that the portion is colored in orange, for example. The brightness correction of the fogging of the ambient light performed by using the first image data of the scan image 16 of the first print medium 14 in which the second region 14b is colored in orange will be described below. It should be noted that it is assumed that the first image data of the scan image 16 of the first print medium 14 shown in FIG. 2A is subjected to inverse gamma correction.

1) First, the second region image data (red (R), green (G), and blue (B)) of the orange second region 14b of the scan image 16 of the first print medium 14 is integrated and averaged to calculate each of average values Rave, Gave, and Bave of R, G, and B.

2) Here, since the second region 14b is colored, R, G, and B should be equal in white originally, but the white balance is broken, and thus a correction gain value for correcting the white balance is calculated.

For example, correction gain values GainR and GainB are defined with reference to green (G).

$$GainR = Gave/Rave$$

$$GainB = Gave/Bave$$

3) A pixel value of each pixel of the scan image 16 of the first print medium 14, that is, the image data (R, G, and B) is the multiplied by the correction gain values GainR and GainB to calculate a correction pixel value, that is, the image data (R', G', and B').

$R' = R * \text{Gain}R$ $G' = G$ $B' = B * \text{Gain}B$

In this way, the fogging of the ambient light of the first image data of the scan image 16 can be automatically corrected.

It should be noted that, in a case in which stains, handwritten text, or the like, or a design pattern is detected in the image of the second region 14b of the first print medium 14, it is preferable that the correction of the fogging of the ambient light is performed by another method without performing the automatic correction processing of the fogging of the ambient light described above. It should be noted that the processing of the brightness correction of the fogging of the ambient light can be performed by the processor 54.

Next, in the first image processing step S14 shown in FIG. 1, as shown in the block diagram shown in FIG. 2, the first image processing 22 according to the color reproduction characteristic of the first print medium 14 is performed with respect to the third image data of the film image 20 generated in the second image processing step S12 to acquire the third image data subjected to the first image processing 22 as the second image data of an original image 24. Here, the first image processing 22 is carried out by the processor 54 shown in FIG. 3.

It should be noted that, in the first image processing step S14, the processor 54 may directly perform the first image processing 22 according to the color reproduction characteristic of the first print medium 14 with respect to the first image data of the scan image 16 acquired in the acquisition step S10 to acquire the first image data subjected to the first image processing 22 as the second image data of the original image 24.

It should be noted that the second image data of the original image 24 generated in this way is transmitted to the storage step S16 of the second image data, which will be described below, and is stored in the storage 26.

The first image processing 22 is processing of further performing, by the processor 54, reverse correction according to the color reproduction characteristic of the first print medium 14, more specifically, the color reproduction characteristic of the first print medium 14 (instant film or the like) before the image is printed, with respect to the film image 20 or the scan image 16, and reconstructing the original image 24 which is the image before being printed on the first print medium 14.

In addition, the first image processing 22 is image processing of performing, by the processor 54, the correction for restoring the color reproduction of the film image 20 or the scan image 16 changed due to the color reproduction characteristic of the first print medium 14 (instant film or the like) before the image is printed, to the second image data of the original image 24 before the change, with respect to the third image data or the first image data. That is, the first image processing 22 is three-dimensional look-up table (3D LUT) processing 22a, which is related to three primary colors of R, G, and B, of restoring the R, G, and B data for each pixel related to, for example, three primary colors of R, G, and B which is the third image data of the film image 20 or the first image data of the scan image 16, to the R, G, and B data for each pixel which is the second image data of the original image 24.

Here, the following description will be made assuming that, for example, a 3D LUT of INSTAX Natural mode of FUJIFILM Corporation is used as the color reproduction characteristic which is a standard in the present invention. That is, the description will be made by using, as the standard, the color reproduction characteristic in a case in which an image is captured by using an analog camera, such as INSTAX manufactured by FUJIFILM Corporation, in other words, the color reproduction characteristic of the instant film (INSTAX film manufactured by FUJIFILM Corporation) which is the print medium in a case in which an image is captured by using the analog camera.

Figure 4:
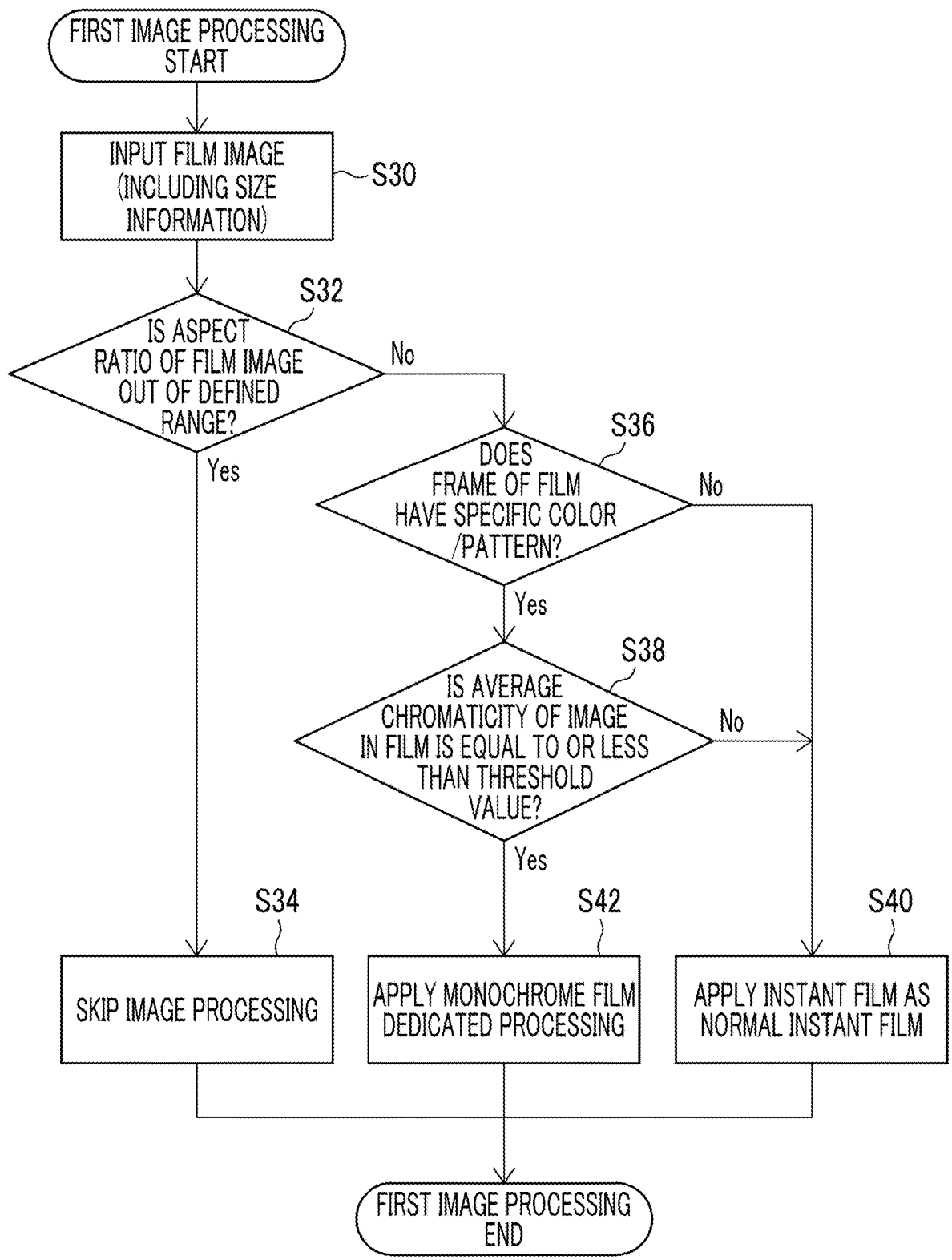
FIG. 4 is a flowchart of first image processing carried out in the image processing method according to the embodiment of the present invention.

FIG. 4 is a flowchart from the start (START) to the end (END) of the first image processing carried out by the processor 54 in the image processing method according to the embodiment of the present invention.

As shown in FIG. 4, in the first image processing 22 according to the embodiment of the present invention, first, the third image data of the film image 20 is input in the film image input step S30. The third image data of the film image 20 includes size information of the film image 20, and thus the first print medium 14, such as the number of pixels (horizontal and vertical) and the aspect ratio (aspect ratio of the number of pixels).

Then, the processing proceeds to a step S32, that is, the step S32 for performing size determination. In the step S32, it is determined whether or not the aspect ratio of the input film image 20 is out of a defined range. Since the instant film described above has an aspect ratio standard, in a case in which it is determined that the aspect ratio is not the aspect ratio of the instant film, that is, it is determined that the instant film is out of the defined range (Yes), the processing proceeds to a skip step S34, the image processing is skipped, and the first image processing ends. Thereafter, the image processing method according to the embodiment of the present invention shown in FIG. 1 may end.

It should be noted that, here, since the color reproduction characteristic of the instant film is used as the standard, the image processing is skipped. However, the present invention is not limited to this, and any of various sizes of a silver salt film or other photographic films may be specified to perform the image processing suitable for the specified film.

On the other hand, in the step S32, in a case in which it is determined that the aspect ratio is the aspect ratio of the instant film, that is, it is determined that the aspect ratio of the instant film is within the defined range (No), the processing proceeds to a step S36.

In a frame determination step S36, it is determined whether or not the frame (second region) of the instant film in which the film image 20 is acquired has a specific color/pattern.

In the frame determination step S36, in a case in which it is determined that the frame (second region) has the specific color or the specific pattern (Yes), the processing proceeds to a chromaticity determination step S38.

On the other hand, in the frame determination step S36, in a case in which it is determined that the frame (second region) does not have the specific color or the specific pattern (No), it is determined that the instant film is a normal instant film, and the processing proceeds to an instant film image processing step S40.

Next, in the image chromaticity determination step S38, it is determined whether or not the average chromaticity of the image in the instant film is equal to or less than a threshold value.

In the image chromaticity determination step S38, in a case in which it is determined that the average chromaticity of the image in the instant film is equal to or less than the threshold value, it is determined that the instant film is the monochrome film, and the processing proceeds to a step S42.

On the other hand, in the image chromaticity determination step S38, in a case in which it is determined that the average chromaticity of the image in the instant film is not equal to or less than the threshold value, it is determined that the instant film is the normal instant film, and the processing proceeds to a normal instant film image processing step S40.

Since it is determined that the instant film is the normal instant film in the determination steps S36 and S38, in the image processing step S40, an instant film LUT 23a is applied as 3D LUT processing 22a of the first image processing 22. In this way, the first image processing 22 ends.

On the other hand, in the image processing step S42, since it is determined that the instant film is the monochrome film in the determination step S38, a monochrome film LUT 23c is applied as the 3D LUT processing 22a of the first image processing 22.

Figure 5:
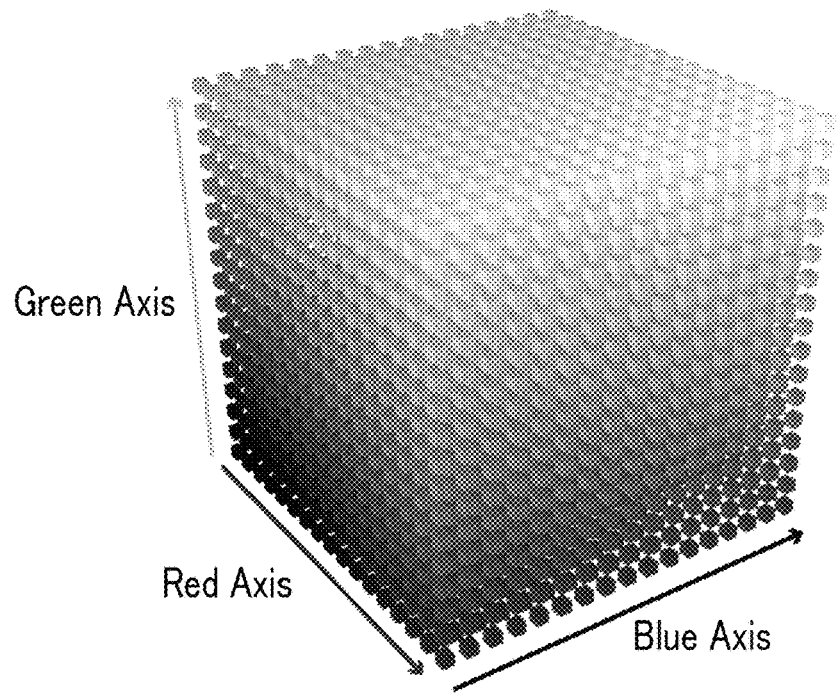
FIG. 5 is a diagram showing an example of a 3D LUT consisting of red (R), green (G), and blue (B) used in the first image processing of the image processing method according to the embodiment of the present invention.

Here, as the 3D LUT of the 3D LUT processing 22a of the first image processing 22, for example, the 3D LUT shown in FIG. 5 can be used.

It should be noted that it is preferable that the 3D LUT processing 22a of the first image processing 22, for example, the instant film LUT 23a, and the monochrome film LUT 23c are stored in the memory 56 of the image processing apparatus 50 shown in FIG. 3.

As described above, in the first image processing 22, it may be discriminated that the first print medium 14 is the print medium having the color reproduction characteristic different from the standard, that is, the monochrome film from at least one of a frame design of the second region 14b, a print medium size, or the scan image 16 of the first print medium 14.

It should be noted that, in a case in which the print medium other than the instant film is included as the print medium of the first print medium 14, a discrimination method different from the discrimination method described above may be used as a method of discriminating the type of the print medium.

It should be noted that, in a case in which the first image processing 22 is applied to a print matter other than the instant film, it is necessary to change the correction content of the first image processing 22, and it is, needless to say, necessary to measure the color reproducibility of each of print media in advance and reflect the color reproducibility in the first image processing 22.

In FIG. 4, only two instant films, which are the normal instant film and the monochrome film, are adopted. However, in a case in which an analog device, such as the analog camera targeted for the instant film and a digital device, such as the digital camera, coexist, it may be printed as the first print medium 14 after performing high chroma saturation processing or high color gamut processing by using the 3D LUT processing as preprocessing in advance with the digital device. In a case in which the high chroma saturation processing or the high color gamut processing is performed in the first image processing 22, a high chroma saturation processing LUT 23b is applied as the 3D LUT processing 22a. In addition, it is preferable that the high chroma saturation processing LUT 23b as the 3D LUT processing 22a of the first image processing 22 is also stored in the memory 56 of the image processing apparatus 50 shown in FIG. 3.

In this case, it is necessary to perform the reverse correction according to the color reproduction characteristic of the instant film described above as the first image processing 22 after performing the reverse correction of the high chroma saturation processing or the high color gamut processing with respect to the first image data of the scan image 16 or the third image data of the film image 20 once. Alternatively, it is necessary to perform the first image processing 22 in consideration of the high chroma saturation processing or the high color gamut processing as the preprocessing in addition to the color reproduction characteristic (color gamut) of the instant film.

Therefore, before performing the first image processing 22, it is necessary to discriminate whether or not the image of the first print medium 14 is an image subjected to the high chroma saturation processing or the high color gamut processing. Therefore, it is preferable that an identifier that identifies the specific image processing, such as the high chroma saturation processing and the high color gamut processing, is included in the first image processing 22, for example, QR code (registered trademark), electronic watermark, watermark, or an identifier that is preferably not displayed on the reprint is stored in the terminal 10 as the terminal information, or is stored in the second image data of the original image 24 as the accessory information. It should be noted that the terminal information may be stored in the memory 56 of the image processing apparatus 50, which is the terminal 10, or may be stored in the storage 26.

In the present invention, in a case in which the first image data of the scan image 16 or the third image data of the film image 20 that is simply scanned on the instant film having low color reproducibility is printed, the print color reproducibility is poor, and thus the color looks faded. Therefore, by reconstructing the original image 24 before printing of the first print medium 14 by the first image processing 22, and using the second image data of the original image 24 during the printing (reprinting), it is possible to ensure the color reproducibility of the printing.

Figure 6:
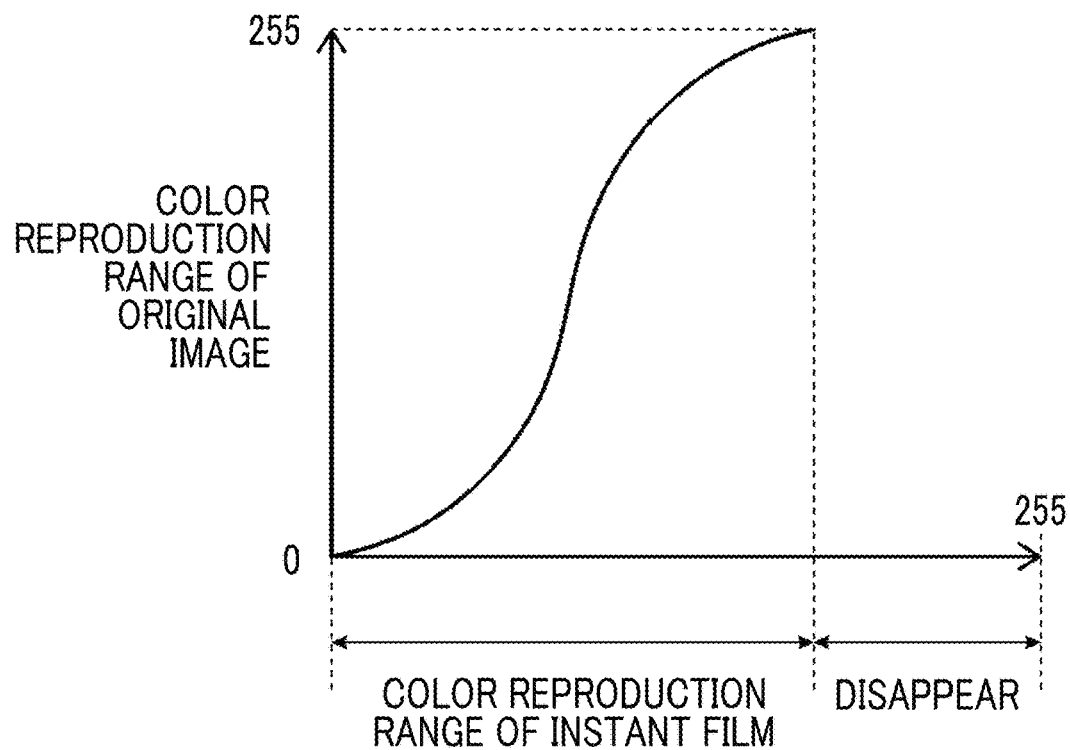
FIG. 6 is a graph showing a 1D LUT of one color of RGB of the 3D LUT shown in FIG. 5.

For example, in a case in which a relationship between the color reproduction characteristics of the original image 24 and the image of the instant film (for example, the scan image 16 of the first print medium 14) is represented for one color of R, G, and B, the graph as shown in FIG. 6 is obtained. As shown in FIG. 6, a color reproduction range of the original image 24 is 255 gradation close to 256 gradation, whereas a color reproduction range of the image of the instant film (scan image 16) is a gradation that is significantly smaller than the 255 gradation. The graph as shown in FIG. 6 can also be said to be a 1D LUT between the image data in a case in which the original image 24 is printed on the instant film, or can also be said to be a 1D LUT in a case in which the scan image 16 of the instant film is subjected to the reverse correction.

It should be noted that the remaining two colors of R, G, and B are also represented by the 1D LUT having the same tendency.

Next, in the storage step S16 of the second image data of the original image 24 shown in FIG. 1, as in the block diagram shown in FIG. 2, the second image data of the original image 24 acquired in the first image processing step S14 is stored in the terminal 10, that is, a region 26a of the storage 26 of the image processing apparatus 50 shown in FIG. 3, as O image 001.

Next, in the transmission step S18 of the second image data of the original image 24 shown in FIG. 1, as in the block diagram shown in FIG. 2, the terminal 10 transmits the second image data of the original image 24 stored in the storage 26 in the storage step S16 of the second image data to the printer 28 through, for example, the communication interface 58 of the image processing apparatus 50 shown in FIG. 3.

That is, the terminal 10 has a function of reprinting the original image finally obtained by scanning the first print medium 14, and in a case of the reprinting, reads out the second image data of the original image 24 as the image data transmitted to the printer 28 from application software provided in the terminal 10, and transmits the second image data through the communication interface 58.

Here, the second image data of the original image 24 transmitted to the printer 28 includes a third region corresponding to the first region 14a, which is a photographic image region of the first print medium 14, and a fourth region corresponding to the second region 14b, which is a frame region of the first print medium 14. The third region of the second image data is the photographic image region of the original image 24, and comprises third region image data. The fourth region of the second image data is the frame region of the original image 24, and comprises fourth region image data.

In the transmission step S18, in a case of the printing on the print medium, the second image data of the original image 24 is transmitted to the printer 28 through the communication interface 58, but it is preferable that the third region (photographic) image data in which the third region (photographic image region) of the second image data of the original image 24 is cut out is transmitted to the printer 28.

It should be noted that, although the second print medium is printed and output from the printer 28, the second print medium also has the photographic image region corresponding to the third region of the second image data and the frame region corresponding to the fourth region of the second image data.

Next, in the storage step S20 of the third image data of the film image 20 shown in FIG. 1, as in the block diagram shown in FIG. 2, the third image data of the film image 20 acquired in the second image processing step S12 is stored in a region 26b of the storage 26 of the terminal 10 (that is, the image processing apparatus 50 shown in FIG. 3) as F image 001.

Here, as shown in FIG. 2, it is preferable that the third image data of the film image 20 and the second image data of the original image 24 are stored in association with the storage 26 of the terminal 10 so as to enter the same region 26c. That is, it is preferable that the film image 20 and the original image 24 are stored in association with each other. It should be noted that the second image data of the original image 24 may be stored in the storage 26 of the terminal 10 in association with the first image data of the scan image 16 and/or the third image data of the film image 20.

Next, in the playback display step S22 of the film image 20 shown in FIG. 1, as in the block diagram shown in FIG. 2, the third image data stored in the storage step S20 of the third image data of the film image 20 is displayed as the film image 20 on the display device (display) 30 of the terminal 10 (that is, the image processing apparatus 50 shown in FIG. 3).

It should be noted that, in addition to the display device 30, the terminal 10 has a playback mode in which the image data is played back. In this playback mode, it is preferable that the third image data of the film image 20 or the second image data of the original image 24 is displayed on the display device 30 based on a mode set by the user.

That is, on the terminal 10, it is possible to change the mode to the playback mode on the application software separately from a scan mode in which the first print medium 14 is scanned to acquire the first image data of the scan image 16. In a case in which the image is viewed in this playback mode, it is preferable that the film image 20 is read out and displayed on the display device 30 of the terminal 10, but the original image 24 may be read out and displayed.

The block diagram shown in FIG. 2 is composed of the camera-equipped terminal 10 which is a smart device, such as the smartphone, and the first image data acquired by executing the acquisition step S10 of acquiring the first image data of the scan image 16 by scanning the first print medium 14 with the terminal 10 is transmitted to the computer (personal computer; PC), the server, and the like through a network, so that the remaining steps S12 to S22 of the image processing method according to the embodiment of the present invention may be performed by the computer and/or the server. That is, components other than the scanner 52 of the image processing apparatus 50 shown in FIG. 3 which constitute the camera-equipped terminal 10 may be configured by using the computer and/or the server. Of course, the image processing apparatus 50 shown in FIG. 3 may be configured by using the computer and/or the server comprising the scanner.

The computer and/or server used here may be any computer and/or server as long as the steps S12 to S22 can be executed. For example, similar to the image processing apparatus 50 shown in FIG. 3, it is sufficient that the processor 54, the memory 56, the communication interface 58, the storage 26, and the like are provided, and an integrated server computer comprising these components may be used. Further, the computer may include the input device 60, such as a keyboard, a mouse, and a scanner, and an output device, such as the display device 30 such as the display, or may further include an output device, such as the printer 28.

It should be noted that, in the image processing apparatus 50, the computer, and/or the server shown in FIG. 3, the processor 54 is configured by using, for example, a central processing unit (CPU), a graphics processing unit (GPU), a digital signal processor (DSP), a tensor processing unit (TPU), or the like. The memory 56 is configured by using, for example, a semiconductor memory, such as a read only memory (ROM) and a random access memory (RAM). The communication interface is configured by using, for example, a network interface card or a communication interface board.

As described in detail above, in the present invention, for example, in a case in which the scan image obtained by scanning the first print medium, such as the instant photographic print, with the application of the camera-equipped terminal, such as the smartphone, is attempted to be printed again, the original image is estimated from the scan image, reconstructed, and then reprinted, so that high print reproducibility can be realized. In particular, in a case in which the scan image simply scanned or the film image corrected for the influence of the scanning on the image quality is directly printed on the instant film having low color reproducibility, the print reproducibility is poor, but the reconstructed original image is printed in the present invention, so that the print reproducibility can be improved.

Further, by storing the scan image and the film image as a set in association with the original image, it is also possible to check the texture of the print on the terminal, such as the smartphone.

The image processing method and the image processing apparatus according to the embodiment of the present invention are configured as described above.

Although the image processing method and the image processing apparatus according to the embodiment of the present invention have been described in detail above, the present invention is not limited to the embodiment described above, and it is needless to say that various improvements and changes may be made without departing from the gist of the present invention.

EXPLANATION OF REFERENCES

10: camera-equipped terminal
12: camera
14: first print medium
14a: first region (photographic image region)
14b: second region (frame region)
16: scan image
18: second image processing
18a: light reflection removal processing
18b: ambient light fogging removal processing
19: manual correction image quality parameter
20: film image
22: first image processing
22a: three-dimensional look-up table (3D LUT) processing
23a: instant film LUT
23b: high chroma saturation processing LUT
23c: monochrome film LUT
24: original image
26: storage
26a, 26b, 26c: region
28: printer
30: display device (display)
50: image processing apparatus
52: scanner
54: processor
56: memory
58: communication interface
60: input device
S10: acquisition step of first image data of first print medium
S12: second image processing step of generating third image data from first image data
S14: first image processing step of generating second image data from third image data
S16: storage step of second image data
S18: transmission step of second image data
S20: storage step of third image data
S22: playback display step using third image data
S30: film image input step
S32: step of performing size determination
S34: skip step
S36: frame determination step
S38: chromaticity determination step
S40: instant film image processing step
S42: monochrome film image processing step

What is claimed is:

1. An image processing method comprising:
acquiring first image data from a first print medium on which an image is printed by scanning the first print medium;
performing second image processing of correcting an influence of the scanning on an image quality with respect to the first image data to acquire the first image data subjected to the second image processing as third image data; and
performing first image processing with respect to the acquired third image data according to a color reproduction characteristic of the first print medium to acquire the third image data subjected to the first image processing as second image data.

2. The image processing method according to claim 1, wherein the second image data is transmitted to a printer.

3. The image processing method according to claim 1, wherein the first image processing is image processing of correcting color reproduction of the image changed due to the color reproduction characteristic with respect to the first image data.

4. The image processing method according to claim 1, wherein a target of the correction is an influence of reflected light during imaging and/or ambient light on the image quality.

5. The image processing method according to claim 1, wherein the first image data is scan image data acquired by imaging and scanning the first print medium with a camera-equipped terminal.

6. The image processing method according to claim 5, wherein the second image data is stored in the terminal in association with the first image data and/or the third image data.

7. The image processing method according to claim 5, wherein the terminal includes a display device and a playback mode in which the image data is played back, and
in the playback mode, the third image data or the second image data is displayed on the display device based on a mode set by a user.

8. The image processing method according to claim 5, wherein the terminal transmits the second image data to a printer.

9. The image processing method according to claim 1, wherein, in the second image processing, a user is able to manually adjust an image quality parameter, and
one or more of the image quality parameters are stored in a terminal as terminal information, or are stored in the third image data as accessory information.

10. The image processing method according to claim 9, wherein the one or more image quality parameters include at least one of brightness, contrast, or chroma saturation of an image of the third image data.

11. The image processing method according to claim 9, wherein, in the second image processing, the image quality parameter stored in the third image data is updated in a case in which the image quality parameter is adjusted.

12. The image processing method according to claim 1, wherein the first print medium has a first region and a second region, and the second image data has a third region and a fourth region corresponding to the first region and the second region, respectively, and
image data in which the third region of the second image data is cut out is transmitted to a printer.

13. The image processing method according to claim 1, wherein, in the first image processing, it is discriminated that the print medium has the color reproduction characteristic different from a standard from at least one of a frame design, a print medium size, or the image of the first print medium.

14. The image processing method according to claim 1, wherein an identifier that identifies that specific image processing is included in the first image processing is stored in a terminal as terminal information, or is stored in the second image data as accessory information.

15. The image processing method according to claim 5, wherein an imaging condition and/or an adjustment condition in a case of imaging with the camera-equipped terminal is decided based on information on a specific region of the first print medium.

16. An image processing apparatus comprising:
a scanner that acquires first image data from a first print medium on which an image is printed; and
a processor that performs second image processing of correcting an influence of scanning with the scanner on an image quality with respect to the first image data to acquire the first image data subjected to the second image processing as third image data, and performs first image processing with respect to the acquired third image data according to a color reproduction characteristic of the first print medium to acquire the third image data subjected to the first image processing as second image data.

17. The image processing apparatus according to claim 16, further comprising:
a storage that stores the second image data in association with the first image data and/or the third image data.

18. The image processing apparatus according to claim 16, further comprising:
a display device and a playback mode in which the image data is played back,
wherein, in the playback mode, the third image data or the second image data is displayed on the display device based on a mode set by a user.

19. The image processing apparatus according to claim 16, further comprising:
a communication interface that transmits the second image data to a printer.

* * * * *